(12) United States Patent
Maeda et al.

(10) Patent No.: US 12,308,718 B2
(45) Date of Patent: May 20, 2025

(54) MOLDED COIL, STATOR, AND ROTARY ELECTRIC MACHINE

(71) Applicant: Panasonic Intellectual Property Management Co., Ltd., Osaka (JP)

(72) Inventors: Yuya Maeda, Osaka (JP); Yasuaki Matsushita, Kyoto (JP); Hirokazu Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

(21) Appl. No.: 18/000,677

(22) PCT Filed: May 24, 2021

(86) PCT No.: PCT/JP2021/019499
§ 371 (c)(1),
(2) Date: Dec. 3, 2022

(87) PCT Pub. No.: WO2021/256178
PCT Pub. Date: Dec. 23, 2021

(65) Prior Publication Data
US 2023/0299630 A1    Sep. 21, 2023

(30) Foreign Application Priority Data

Jun. 17, 2020 (JP) ................................ 2020-104379

(51) Int. Cl.
*H02K 3/28* (2006.01)
*H02K 1/16* (2006.01)
*H02K 3/12* (2006.01)

(52) U.S. Cl.
CPC ................. *H02K 3/28* (2013.01); *H02K 1/16* (2013.01); *H02K 3/12* (2013.01)

(58) Field of Classification Search
CPC ... H01F 5/04; H02K 1/16; H02K 3/12; H02K 3/18; H02K 3/28; Y02T 10/64; F04D 27/004
See application file for complete search history.

(56) References Cited

U.S. PATENT DOCUMENTS 9,325,213 B2 * 4/2016 Egami .................. H02K 3/50
10,862,367 B2 * 12/2020 Kawanami ............ H02K 3/34
(Continued)

FOREIGN PATENT DOCUMENTS

JP    2000-041365    2/2000
JP    2011-229367    11/2011
(Continued)

OTHER PUBLICATIONS

WO-2019168360-A1, Kwon, all pages (Year: 2019).*
(Continued)

*Primary Examiner* — Naishadh N Desai
(74) *Attorney, Agent, or Firm* — Rimon P.C.

(57) ABSTRACT

A first molded coil that is one of two molded coils disposed adjacent to each other includes: a first winding part in which a conductor is stacked from a first turn to an n-th turn (n is an integer of 2 or more); and a first terminal part that has a lead part extending from a portion of the first turn of the first winding part in a direction orthogonal to a stacking direction of the conductor in the first winding part, in which the first terminal part is provided at a tip with a first engaging part that is engaged with a second engaging part disposed at a tip of a third terminal part of a second molded coil that is the other molded coil of the two molded coils.

19 Claims, 13 Drawing Sheets

(56) References Cited

U.S. PATENT DOCUMENTS

| | | | | |
|---|---|---|---|---|
| 2011/0241461 A1* | 10/2011 | Utaka | ...................... | H02K 3/12 |
| | | | | 310/71 |
| 2015/0155750 A1* | 6/2015 | Hashimoto | .............. | H02K 1/02 |
| | | | | 310/43 |
| 2020/0403474 A1* | 12/2020 | Lee | .......................... | H02K 3/46 |

FOREIGN PATENT DOCUMENTS

| | | | | |
|---|---|---|---|---|
| JP | 5245782 B2 | | 7/2013 | |
| WO | WO-2019168360 A1 * | | 9/2019 | ............... H02K 3/12 |

OTHER PUBLICATIONS

International Search Report of PCT application No. PCT/JP2021/019499 dated Aug. 3, 2021.
The EPC Office Action dated Oct. 30, 2023 for the related European Patent Application No. 21825762.4.

* cited by examiner

MOLDED COIL, STATOR, AND ROTARY ELECTRIC MACHINE

TECHNICAL FIELD

The present disclosure relates to a rotary electric machine including an electric motor, a stator used in the rotary electric machine, and a molded coil used as a winding coil of the stator.

BACKGROUND ART

As one of rotary electric machines, an electric motor that converts electrical energy into mechanical energy is known. The electric motors are used in various products such as household appliances or industrial apparatuses. For example, the electric motors are used in a wide variety of applications including household electric products such as vacuum cleaners, and also including automobiles and robots.

In recent years, the electric motor is required to have higher efficiency and lower cost. As a method of improving efficiency of the electric motor, a winding coil used in a stator of the electric motor has been proposed to be increased in space factor. By increasing the space factor of the winding coil, loss can be suppressed, which occurs due to a current flowing through the winding coil at the time of driving an electric motor. Therefore, an efficiency of the electric motor can be improved.

Conventionally, as one of techniques for increasing the space factor of a winding coil disposed in a stator of an electric motor, an edgewise coil or a molded coil is known to be used as the winding coil. For example, PTL 1 discloses an electric motor using a molded coil molded so as to conform to a slot shape of a stator.

In the electric motor, a winding coil is disposed in a slot of the stator. A plurality of the winding coils disposed in the slots of the stator are electrically connected to each other by wire connection. In this case, because a round wire coil constituted of a string of round wire can freely route the round wire drawn from a winding part, in the stator using the round wire coil as the winding coil, a plurality of the round wire coils arranged in the slot can be easily connected to each other.

However, the molded coil is constituted of a plate-shaped conductor having high rigidity unlike the round wire coil. Therefore, in the stator using the molded coil as the winding coil, the plurality of molded coils disposed in the slot cannot be easily connected to each other as compared with the case of using the round wire coil.

For example, a molded coil is known which includes a winding part in which a plate-shaped conductor is stacked, a first terminal part protruding from a portion of a first turn (winding start) of the winding part, and a second terminal part protruding from a portion of a final turn (winding end) of the winding part.

When this kind of molded coil is disposed in each of the plurality of slots of the stator, in each molded coil, the positions of the first terminal part and the second terminal part are different in the radial direction of the stator. That is, the positions of the first terminal part and the second terminal part in each molded coil do not exist at positions equidistant from the center of the stator. That is, the first terminal part and the second terminal part are not located on the same circumference.

For this reason, in order to connect the two molded coils having the same shape and disposed in the slot of the stator, a coupling member such as a bus bar needs to be separately used. For example, the bus bar is bridged between two adjacent molded coils, a first terminal part of one molded coil of the two molded coils and one end of the bus bar are joined, and a second terminal part of the other molded coil of the two molded coils and the other end of the bus bar are joined.

However, at the time of connecting the two molded coils using the bus bar in this manner, a jig or equipment needs to be frequently moved when the molded coil and the bus bar are joined, and the connection work becomes complicated.

CITATION LIST

Patent Literature

PTL 1: Unexamined Japanese Patent Publication No. 2000-041365

SUMMARY OF THE INVENTION

The present disclosure has been made to solve the above problems. An object of the present disclosure is to provide a molded coil in which two molded coils can be easily connected to each other without using a coupling member such as a bus bar, a stator using the molded coil, and a rotary electric machine using the stator.

In order to achieve the above object, one aspect of a molded coil according to the present disclosure is a molded coil that is one of two molded coils disposed adjacent to each other, the molded coil including: a winding part having a conductor stacked from a first turn to an n-th turn (n is an integer of 2 or more); a first terminal part that has a lead part extending from the first turn of the winding part in a direction orthogonal to a stacking direction of the conductor in the winding part; and a second terminal part that has a lead part extending from a portion of the n-th turn of the winding part in the direction orthogonal to the stacking direction of the conductor in the winding part, in which the first terminal part includes a tip including a first engaging part that is engaged with a second engaging part disposed at a tip of a terminal part of the other molded coil of the two molded coils.

Further, one aspect of a stator according to the present disclosure includes: a core including a plurality of teeth; and a plurality of molded coils each wound around a corresponding one of the plurality of teeth, in which the plurality of molded coils include a first molded coil and a second molded coil disposed adjacent to the first molded coil, the first molded coil includes: a first winding part having a first conductor stacked from a first turn to an $n_1$-th turn ($n_1$ is an integer of 2 or more); a first terminal part having a lead part extending from a portion of the first turn of the first winding part in a direction orthogonal to a stacking direction of the first conductor in the first winding part; and a second terminal part having a lead part extending from a portion of the $n_1$-th turn of the first winding part in a direction orthogonal to the stacking direction of the first conductor in the first winding part, the second molded coil includes: a second winding part having a second conductor stacked from a first turn to an $n_2$-th turn ($n_2$ is an integer of 2 or more); a third terminal part having a lead part extending from a portion of the first turn of the second winding part in a direction orthogonal to a stacking direction of the second conductor in the second winding part; and a fourth terminal part having a lead part extending from a portion of the $n_2$-th turn of the second winding part in a direction orthogonal to the stacking direction of the second conductor in the second winding part, the first terminal part includes a tip including a first engaging part, the third terminal part includes a tip including a second engaging part that is engaged with the first engaging part, and the first terminal part is coupled to the third terminal part by joining the first engagement part to the second engaging part.

One aspect of a rotary electric machine according to the present disclosure includes the stator and a rotor that rotates by a magnetic force of the stator.

According to the present disclosure, the two molded coils can be easily connected to each other without using a coupling member such as a bus bar.

DESCRIPTION OF EMBODIMENT

Hereinafter, an exemplary embodiment of the present disclosure is described. Note that the exemplary embodiment described below shows a specific example of the present disclosure. Therefore, numerical values, constituent elements, positions at that the constituent elements are disposed and connection modes of the constituent elements, and steps, order of the steps, and the like shown in the following exemplary embodiment are merely examples, and are not intended to limit the present disclosure. Thus, among the constituent elements in the following exemplary embodiment, constituent elements that are not described in independent claims indicating the highest concept of the present disclosure are described as optional constituent elements.

Each of the drawings is a schematic view and is not necessarily exactly illustrated. Note that, in each of the drawings, substantially the same configurations are denoted by the same reference marks to eliminate or simplify duplicated description.

In the present exemplary embodiment, a radial direction of stator 10 and rotor 20 is referred to as a "radial direction", and a rotation direction of rotor 20 is referred to as a "circumferential direction". That is, a direction extending from shaft center C of rotary shaft 23, with shaft center C as a center, is a "radial direction", and a direction around shaft center C of rotary shaft 23, with shaft center C as a center, is a "circumferential direction". Therefore, the "radial direction" is a direction orthogonal to a direction of shaft center C of rotary shaft 23. In the present description, the terms "above" and "below" do not necessarily indicate an upward direction (vertically above) and a downward direction (vertically below) in terms of absolute spatial recognition.

Exemplary Embodiment

In the following present exemplary embodiment, an electric motor is described as an example of a rotary electric machine.

Figure 1:
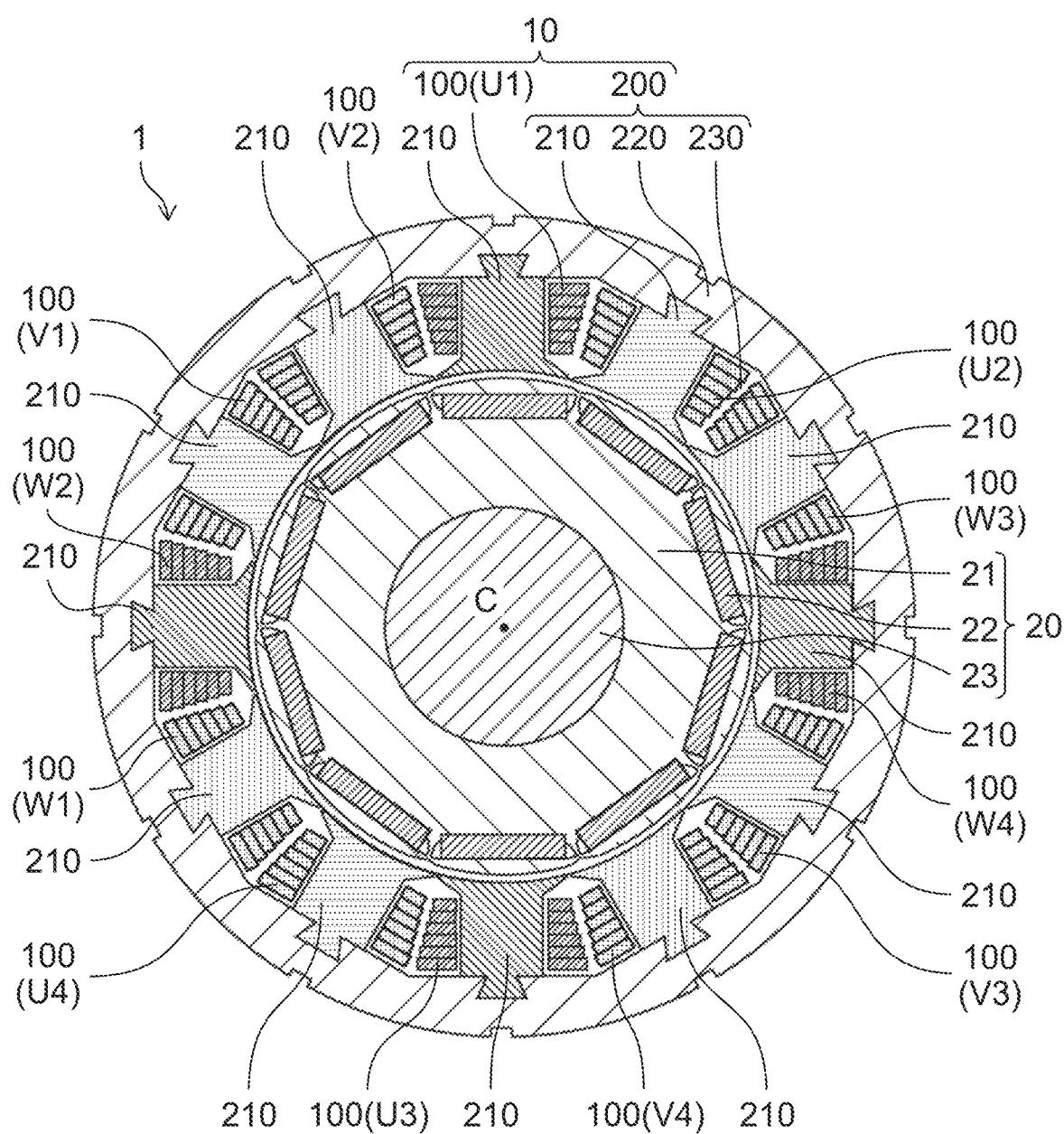
FIG. 1 is a cross-sectional view of an electric motor according to an exemplary embodiment.
Figure 2:
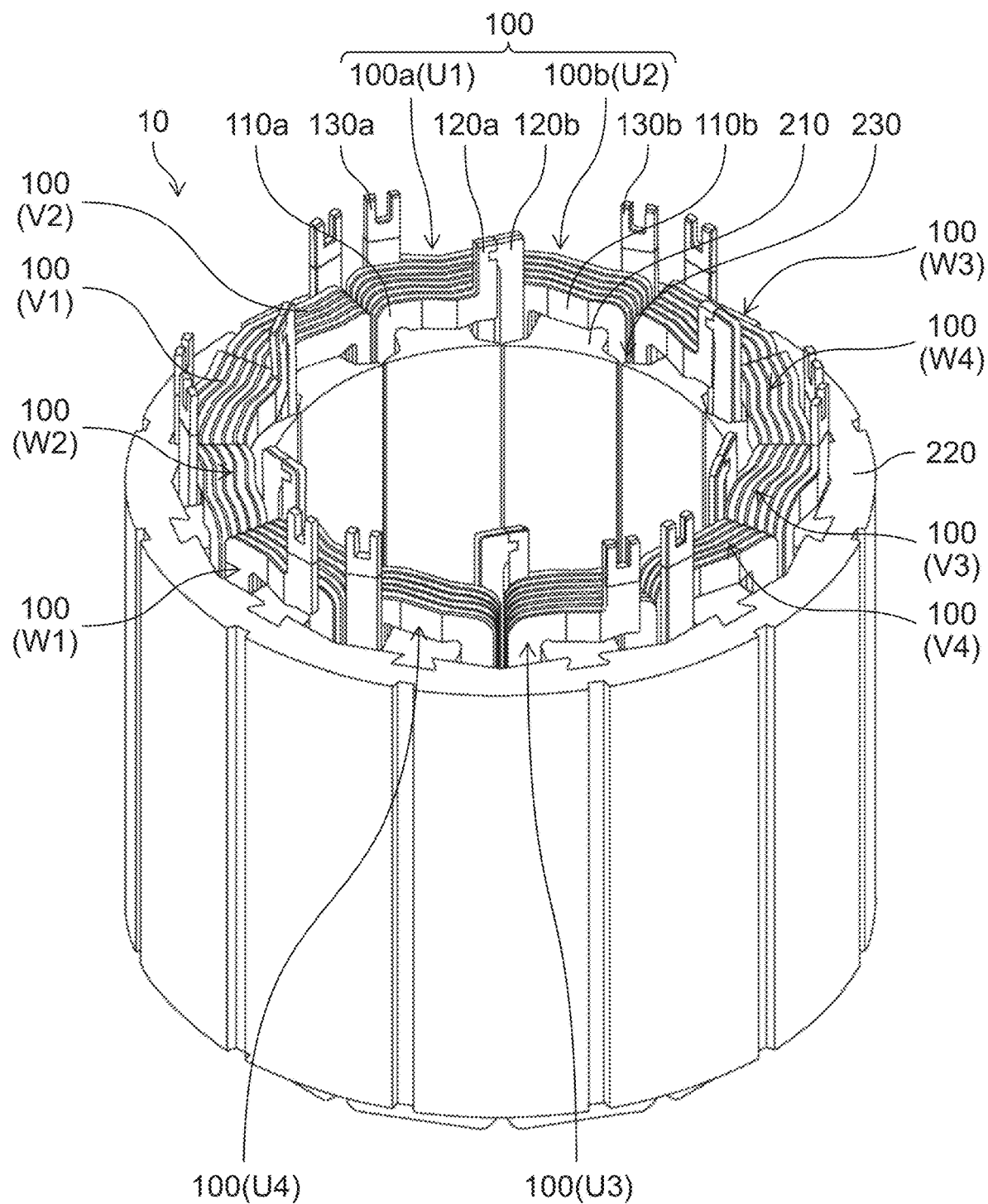
FIG. 2 is a perspective view of a stator in the electric motor according to the exemplary embodiment.

First, the overall configuration of electric motor 1 according to the exemplary embodiment is described with reference to FIGS. 1 and 2. FIG. 1 is a cross-sectional view of electric motor 1 according to the exemplary embodiment. Further, FIG. 2 is a perspective view of stator 10 in electric motor 1. Note that FIG. 1 shows a cross section taken along a plane orthogonal to a direction of shaft center C of rotary shaft 23 provided in rotor 20.

As shown in FIG. 1, electric motor 1 includes stator 10 and rotor 20. Stator 10 and rotor 20 are disposed facing each other. Furthermore, electric motor 1 is a motor of an inner rotor type in which rotor 20 is disposed inside stator 10. Although electric motor 1 includes components other than stator 10 and rotor 20, such as a motor case and a bearing that rotatably supports rotary shaft 23, illustration and description of those components are eliminated for convenience of description.

Stator 10 is disposed facing rotor 20 with an air gap between stator 10 and rotor 20. A minute air gap exists between the surface of rotor 20 and the surface of stator 10. In the present exemplary embodiment, stator 10 is disposed so as to surround rotor core 21 of rotor 20.

Stator 10 generates a magnetic force acting on rotor 20. Specifically, stator 10 is configured to generate a magnetic flux on the surface facing the air gap with rotor core 21 of rotor 20. For example, stator 10 is configured to generate N poles and S poles alternately and repeatedly in the circumferential direction on the surface facing the air gap with rotor core 21.

As shown in FIGS. 1 and 2, stator 10 includes molded coil 100 and stator core 200.

Molded coil 100 is a stator coil provided on stator 10 as a winding coil. Molded coil 100 is an armature winding of stator 10 and is wound around stator core 200. Specifically, molded coil 100 is wound around each of a plurality of teeth 210 of stator 10. Therefore, a plurality of molded coils 100 are used for stator 10. Each of the plurality of molded coils 100 is wound around a corresponding one of the plurality of teeth 210.

The plurality of molded coils 100 are arranged at equal intervals along the circumferential direction so as to surround rotor 20. Each of molded coils 100 is housed in slot 230 of stator 10. Molded coil 100 may be wound around teeth 210 with an insulating member (not illustrated) such as an insulator or an insulating paper interposed therebetween. In this case, for example, molded coil 100 is configured to be wound around the insulator attached to teeth 210.

Unlike a round wire coil using a string of round wire, molded coil 100 is configured by stacking a plate-shaped conductor. Molded coil 100 has a higher space factor than the round wire coil. For example, the space factor of molded coil 100 is more than or equal to 90%.

Molded coil 100 can be formed by, for example, preparing a plurality of rectangular plate materials different in length, width, or thickness, and joining these plates by pressing, cold welding, welding, or another method. As the plate material, for example, a metal plate made of a low-resistance metallic material such as copper or aluminum can be used.

Alternatively, molded coil 100 may be formed by so-called casting in which metallic material such as copper is melted and poured into a mold. The molded coil may also be formed by bending a plate-shaped conductive wire at a predetermined position, the conductive wire being preliminarily formed to be different in width or thicknesses midway. The molded coil may also be formed by rolling a plate-shaped conductive wire having a constant width and thickness at a predetermined portion, changing the width or thickness midway, and then spirally winding the conductive wire. In short, the molded coil 100 can be formed by performing still another processing in addition to winding the conductive wire or by a method different from simply winding the conductive wire.

Note that the shape of molded coil 100 and a joint structure between molded coils 100 are described later.

Stator core 200 is an iron core serving as a core of stator 10. In the present exemplary embodiment, stator core 200 includes the plurality of teeth 210 and annular yoke 220.

Each of the plurality of teeth 210 protrudes toward shaft center C of rotary shaft 23 of rotor 20. Specifically, the plurality of teeth 210 are provided radially in a direction (radial direction) orthogonal to shaft center C of rotary shaft 23.

Slot 230 configured to have molded coil 100 disposed therein is disposed between two adjacent teeth 210. That is, slot 230 of stator 10 corresponds between two adjacent teeth 210. The plurality of teeth 210 are disposed at equal intervals in the circumferential direction while having slot 230 disposed between two adjacent teeth 210. In the present exemplary embodiment, because stator 10 has twelve teeth 210, the number of slots of stator 10 is twelve. Therefore, twelve molded coils 100 are used.

In the present exemplary embodiment, each of teeth 210 extends so as to protrude radially inward from annular yoke 220. That is, yoke 220 is a back yoke disposed outside each of teeth 210. Each of teeth 210 is fitted and fixed to yoke 220.

Each of teeth 210 and yoke 220 is a stacked body formed by stacking a plurality of electromagnetic steel sheets. Each of the plurality of electromagnetic steel sheets is, for example, a punched steel sheet formed into a predetermined shape. Although being separate bodies, teeth 210 and yoke 220 may be integrated as one stator core 200. Even in a case where teeth 210 and yoke 220 are integrated, stator core 200 is a stacked body formed by stacking a plurality of electromagnetic steel sheets. Note that teeth 210 and yoke 220 are not limited to the stacked body of the plurality of electromagnetic steel sheets regardless of whether the two are separate bodies or integrated, and may be a bulk body made of magnetic material.

The plurality of teeth 210 are magnetic pole teeth, and generate a magnetic force by energization of molded coil 100. The plurality of molded coils 100 in stator 10 are electrically connected as three-phase windings such that rotor 20 rotates as a three-phase synchronous motor. Specifically, the plurality of molded coils 100 include unit coils each having corresponding one of three phases, which are a U-phase, a V-phase, and a W-phase, the phases being electrically different from each other by 120 degrees. That is, molded coil 100 attached to each of teeth 210 is energized and driven by three-phase alternating current energized in units of phases, which are the U-phase, the V-phase, and the W-phase. As a result, a main magnetic flux of stator 10 is generated in each of teeth 210.

In the present exemplary embodiment, twelve molded coils 100 are used as described above. In this case, as shown in FIG. 1, twelve molded coils 100 are divided into four U-phase coils U1 to U4, four V-phase coils V1 to V4, and four W-phase coils W1 to W4 according to the phase of the current flowing through each molded coil 100, and each molded coil is disposed in a predetermined slot 230. Four U-phase coils U1 to U4 are connected in series. Similarly, four V-phase coils V1 to V4 are connected in series. Four W-phase coils to W4 are also connected in series.

Rotor 20 rotates by a magnetic force generated in stator 10. Rotor 20 also generates a magnetic force. Specifically, rotor 20 has a configuration in which a plurality of N poles and S poles that generate the magnetic flux in a circumferential direction are alternately and repeatedly provided. With this configuration, rotor 20 generates a magnetic force acting on stator 10. In the present exemplary embodiment, a direction of the magnetic flux generated by rotor 20 is a direction orthogonal to a direction of shaft center C of rotary shaft 23 (shaft center direction). That is, rotor 20 generates the magnetic flux in a radial direction.

Rotor 20 includes rotor core 21, a plurality of permanent magnets 22, and rotary shaft 23. Rotor 20 rotates around shall center C of rotary shaft 23 as a rotation center. That is, rotary shaft 23 serves as a central axis of rotor 20.

In the present exemplary embodiment, rotor 20 is a permanent magnet embedded-type rotor (interior permanent magnet (IPM) rotor) in which permanent magnet 22 is embedded in rotor core 21. Therefore, electric motor 1 in the present exemplary embodiment is an IPM motor.

Rotor core 21 is an iron core serving as a core of rotor 20. For example, rotor core 21 is a stacked body in which a plurality of electromagnetic steel sheets are stacked along the direction of shaft center C of rotary shaft 23 (shaft center direction). Each of the plurality of electromagnetic steel sheets is, for example, a punched steel sheet formed into a predetermined shape. The plurality of electromagnetic steel sheets are fixed to each other by, for example, crimping. Rotor core 21 is not limited to the stacked body of the plurality of electromagnetic steel sheets, and may be a bulk body made of magnetic material.

Permanent magnet 22 is disposed in a magnet insertion hole provided in rotor core 21. In the present exemplary embodiment, rotor core 21 is provided with ten magnet insertion holes. A plate-shaped permanent magnet 22 is inserted in each of the magnet insertion holes. For example, permanent magnet 22 is a sintered magnet. Note that permanent magnet 22 may be a bonded magnet.

Rotary shaft 23 is an elongated shaft, and is, for example, a metal rod. Rotary shaft 23 is fixed to rotor core 21. Specifically, rotary shaft 23 is inserted into a through hole provided at the center of rotor core 21 and fixed to rotor core 21 such that rotary shaft 23 extends on both sides of rotor core 21 in the direction of shaft center C. Rotary shaft 23 is fixed to rotor core 21 by, for example, press-fitting or shrink-fitting into the through hole of rotor core 21. In electric motor 1, one of portions of the rotary shaft 23 protruding from rotor core 21 functions as an output shaft. For example, a load such as a rotary fan is attached to rotary shaft 23. Although not illustrated, rotary shaft 23 is rotatably supported by a shaft bearing such as a bearing.

Electric motor 1 configured as described above is configured such that when molded coil 100 included in stator 10 is energized, a field current flows through molded coil 100 to generate a magnetic field in stator 10. As a result, a magnetic flux directed from stator 10 toward rotor 20 is generated. Specifically, the magnetic flux directed from each of teeth 210 of stator core 200 included in stator 10 toward rotor 20 is generated. Meanwhile, in rotor 20, a magnetic flux passing through stator 10 is generated by permanent magnet 22 disposed in rotor core 21. The magnetic flux generated in stator 10 and the magnetic flux generated from permanent magnet 22 included in rotor 20 interact with each other to generate a magnetic force that becomes a torque to rotate rotor 20, which causes rotor 20 to rotate.

Figure 3A:
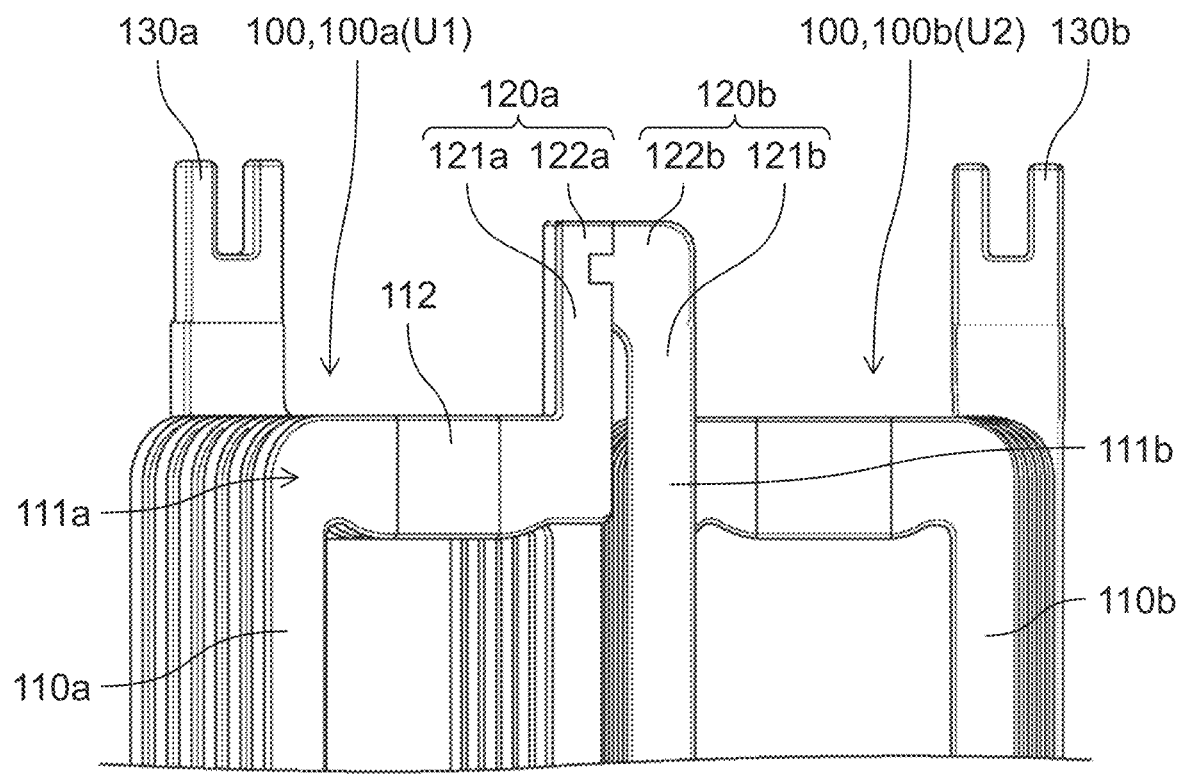
FIG. 3A is an enlarged view of two molded coils adjacent to each other in the stator of the electric motor according to the exemplary embodiment.
Figure 3B:
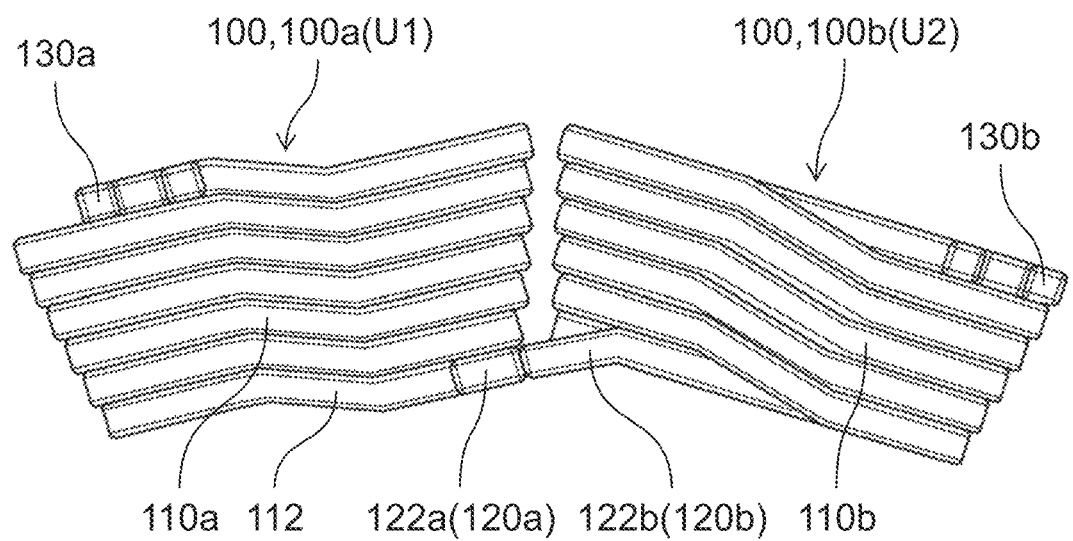
FIG. 3B is a top view of the two molded coils adjacent to each other in the stator of the electric motor according to the exemplary embodiment.
Figure 4:
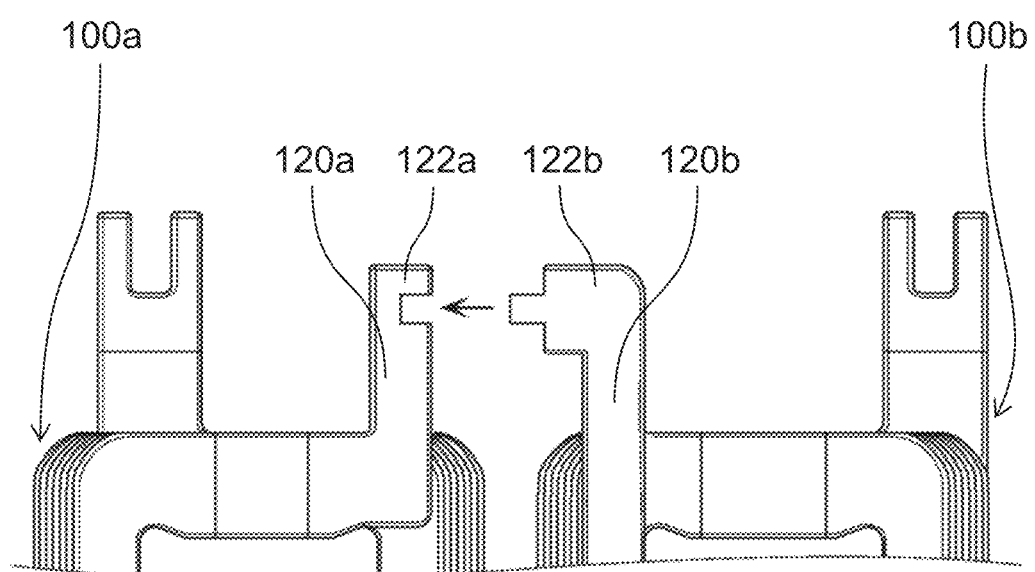
FIG. 4 is a view showing a manner of coupling the two molded coils adjacent to each other in the stator of the electric motor according to the exemplary embodiment.

Next, a detailed configuration of molded coil 100 used in electric motor 1 according to the present exemplary embodiment is described using FIGS. 3A, 3B, and 4, with reference to FIGS. 1 and 2. FIG. 3A is an enlarged view of two molded coils 100 adjacent to each other in stator 10 of electric motor 1 according to the exemplary embodiment. FIG. 3B is a top view of two molded coils 100 adjacent to each other in stator 10 concerned. FIG. 4 is a view showing a manner of coupling two molded coils 100 adjacent to each other in stator 10 concerned.

As described above, four U-phase coils U1 to U4 shown in FIGS. 1 and 2 as molded coils 100 are connected in series. Two molded coils 100, which are U-phase coil U1 and U-phase coil U2, are disposed adjacent to each other. In addition, two molded coils 100, which are U-phase coil U3 and U-phase coil U4, are disposed adjacent to each other.

Similarly, two molded coils 100, which are V-phase coil V1 and V-phase coil V2, are disposed adjacent to each other. Two molded coils 100, which are V-phase coil V3 and V-phase coil V4, are disposed adjacent to each other. Two molded coils 100, which are W-phase coil W1 and W-phase coil W2, are disposed adjacent to each other. Two molded coils 100, which are W-phase coil W3 and W-phase coil W4, are disposed adjacent to each other.

In molded coils 100 of the above, by defining one of two molded coils 100 disposed adjacent to each other as first molded coil 100a and the other as second molded coil 100b, first molded coil 100a and second molded coil 100b are directly connected to each other without a coupling member such as a bus bar.

Hereinafter, the configuration of molded coil 100 is described in detail, and a structure of a joint portion of two molded coils 100 disposed adjacent to each other is described in detail. Specifically, a case is described as an example, the case where, among a plurality of sets of two molded coils 100 disposed adjacent to each other, molded coil 100 being U-phase coil U1 is defined as first molded coil 100a and molded coil 100 being U-phase coil U2 is defined as second molded coil 100b, and U-phase coil U1 and U-phase coil U2 are joined to each other.

First molded coil 100a and second molded coil 100b are constituted of a plate-like conductor coated with an insulating film. Each of the plate-shaped first conductor constituting first molded coil 100a and the plate-shaped second conductor constituting second molded coil 100b has a quadrangular cross-sectional shape and is made of copper.

As shown in FIGS. 2, 3A, and 3B, first molded coil 100a includes first winding part 110a, and first terminal part 120a and second terminal part 130a protruding upward from first winding part 110a.

Assuming that the winding start is a first turn and the winding end is an $n_1$-th turn ($n_1$ is an integer of 2 or more), first winding part 110a has a configuration in which the conductor is stacked from the first turn to the $n_1$-th turn. That is, first winding part 110a has a stacked conductor constituting a coil of $n_1$ turns. First winding part 110a is configured by stacking a flat plate-shaped conductor such that the conductor is spirally wound in the thickness direction.

Specifically, when viewed from the stacking direction of the conductor in first winding part 110a, the shape of first winding part 110a is substantially a rectangular frame shape. That is, first winding part 110a constituted of a flat plate-shaped conductor wound n times from the first turn to the $n_1$-th turn has a substantially rectangular annular shape having four sides when viewed from the radial direction of stator 10.

In the present exemplary embodiment, first winding part 110a is disposed to allow a portion of the first turn to be located in the inner portion of stator 10 and a portion of the $n_1$-th turn to be located in the outer portion of stator 10. That is, in first winding part 110a, the portion of the first turn to the portion of the $n_1$-th turn are stacked in this order from shaft center C of rotary shaft 23 to radially outside. First winding part 110a is housed in slot 230. The outer shape of first winding part 110a is adapted to the shape of slot 230.

Because the entire surface of the plate-shaped conductor constituting first winding part 110a is insulated, an interface between the turns is insulated. Therefore, the current supplied to first winding part 110a flows spirally from the first turn to the $n_1$-th turn or from the $n_1$-th turn to the first turn.

First terminal part 120a and second terminal part 130a function as a connection part configured to electrically connect first molded coil 100a to another molded coil 100 other than first molded coil 100a. In the present exemplary embodiment, first terminal part 120a is connected to second molded coil 100b being U-phase coil U2, and second terminal part 130a is connected to U-phase coil U3 or U-phase coil U4.

First terminal part 120a is a portion where the conductor extends from the first turn of first winding part 110a. First molded coil 100a has, as a part of first winding part 110a of the portion of the first turn, extending part 112 extending toward second molded coil 100b, and first terminal part 120a extends from extending part 112. Specifically, extending part 112 extends, as a part of coil end 111a of first winding part 110a, toward coil end 111b of second winding part 110b in second molded coil 100b. First terminal part 120a protrudes upward from the end of extending part 112 on the side of second molded coil 100b.

First terminal part 120a protruding from first winding part 110a has lead part 121a and first engaging part 122a.

Lead part 121a is a portion extending from a portion of the first turn of first winding part 110a in a direction orthogonal to the stacking direction of the conductor in first winding part 110a. In the present exemplary embodiment, lead part 121a linearly extends upward from the end of extending part 112 on the side of second molded coil 100b.

First engaging part 122a has a shape that is fitted to second engaging part 122b of second molded coil 100b. As shown FIGS. 3A, 3B, and 4, first engaging part 122a has a recess that is fitted to second engaging part 122b. In addition, first engaging part 122a is disposed at a tip of first terminal part 120a. Specifically, first engaging part 122a is disposed at a tip of lead part 121a.

Similarly to first terminal part 120a, second terminal part 130a is a portion where the conductor extends from first winding part 110a. Second terminal part 130a is a portion where the conductor extends from the $n_1$-th turn of first winding part 110a. Specifically, second terminal part 130a has a lead part that extends from a portion of the $n_1$-th turn of first winding part 110a in a direction orthogonal to the stacking direction of the conductor in first winding part 110a. Note that second terminal part 130a extends in the same direction as first terminal part 120a.

Next, second molded coil 100b is described. As shown in FIGS. 2, 3A, and 3B, second molded coil 100b includes second winding part 110b, and third terminal part 120b and fourth terminal part 130b protruding upward from second winding part 110b.

Assuming that the winding start is a first turn and the winding end is an $n_2$-th turn ($n_2$ is an integer of 2 or more), similarly to first winding part 110a of first molded coil 100a, second winding part 110b has a configuration in which the conductor are stacked from the first turn to the $n_2$-th turn. That is, second winding part 110b has a stacked conductor constituting a coil of $n_2$ turns. Similarly to first winding part 110a, second winding part 110b is configured by stacking a flat plate-shaped conductor such that the conductor is spirally wound in the thickness direction.

Specifically, when viewed from the stacking direction of the conductor in second winding part 110b, the shape of second winding part 110b is substantially a rectangular frame shape. That is, second winding part 110b constituted of a flat plate-shaped conductor wound n times from the first turn to the $n_2$-th turn has a substantially rectangular annular shape having four sides when viewed from the radial direction of stator 10.

The size of the frame shape of second winding part 110b is the same as the size of the frame shape of first winding part 110a. The number of windings of second winding part 110b is the same as the number of windings of first winding part 110a. That is, $n_1=n_2=n$. The size of the frame shape of second winding part 110b may be different from the size of the frame shape of first winding part 110a. The number of windings of second winding part 110b may be different from the number of windings of first winding part 110a.

Second winding part 110b is disposed to allow a portion of the first turn to be located in the inner portion of stator 10 and a portion of the $n_2$-th turn to be located in the outer portion of stator 10. That is, in second winding part 110b, the portion of the first turn to the portion of the $n_2$-th turn are stacked in this order from shaft center C of rotary shaft 23 to radially outside. Second winding part 110b is housed in slot 230. The outer shape of second winding part 110b is adapted to the shape of slot 230.

Because the entire surface of the plate-shaped conductor constituting second winding part 110b is insulated, an interface between the turns is insulated. Therefore, the current supplied to second winding part 110b flows spirally from the first turn to the $n_2$-th turn or from the $n_2$-th turn to the first turn.

Note that, unlike first molded coil 100a, second molded coil 100b does not have extending part 112 disposed in first winding part 110a in second winding part 110b. In the present exemplary embodiment, second winding part 110b has the same shape and the same size as those of first winding part 110a except that extending part 112 is not disposed.

Third terminal part 120b and fourth terminal part 130b each function as a connection part configured to electrically connect second molded coil 100b to another molded coil 100 other than second molded coil 100b. In the present exemplary embodiment, third terminal part 120b is connected to first molded coil 110a being U-phase coil U1, and fourth terminal part 130b is connected to U-phase coil U3 or U-phase coil U4.

Third terminal part 120b is a portion where the conductor extends from the first turn of second winding part 110b. Third terminal part 120b protrudes from coil end 111b of second winding part 110b. Third terminal part 120b has lead part 121b and second engaging part 122b.

Lead part 121b is a portion extending from a portion of the first turn of second winding part 110b in a direction orthogonal to the stacking direction of the conductor in second winding part 110b. In the present exemplary embodiment, lead part 121b linearly extends upward from coil end 111b of second winding part 110b.

Second engaging part 122b is engaged with first engaging part 122a of the first molded coil 100a. Specifically, second engaging part 122b has a shape that is fitted to first engaging part 122a of first molded coil 100a. That is, first engaging part 122a of first molded coil 100a and second engaging part 122b of second molded coil 100b have shapes that are fitted to each other. As shown in FIGS. 3A, 3B, and 4, because first engaging part 122a of first molded coil 100a has the recess, second engaging part 122b has a protrusion that fits into the recess.

First terminal part 120a of first molded coil 100a and third terminal part 120b of second molded coil 100b are coupled by joining first engaging part 122a and second engaging part 122b. For example, first engaging part 122a and second engaging part 122b are joined to each other by welding, soldering, crimping, fusing, or the like. First engaging part 122a and second engaging part 122b joined to each other are electrically and mechanically connected to each other. Therefore, at least at a joint portion between first engaging part 122a and second engaging part 122b, the insulating film covering the conductor is removed.

In second molded coil 100b, second engaging part 122b is disposed at a tip of third terminal part 120b. Specifically, second engaging part 122b is disposed at a tip of lead part 121b.

Similarly to third terminal part 120b, fourth terminal part 130b is a portion where the conductor extends from second winding part 110b, but fourth terminal part 130b is a portion where the conductor extends from the $n_2$-th turn of second winding part 110b. Specifically, fourth terminal part 130b has a lead part that extends from a portion of the $n_2$-th turn of second winding part 110b in a direction orthogonal to the stacking direction of the conductor in second winding part 110b. Note that fourth terminal part 130b extends in the same direction as third terminal part 120b.

First molded coil 100a and second molded coil 100b configured as described above are disposed such that the first turn of first winding part 110a of first molded coil 100a and the first turn of second winding part 110b of second molded coil 100b are located on the same one side.

In the present exemplary embodiment, as described above, first molded coil 100a and second molded coil 100b are disposed such that the first turn of first winding part 110a and the first turn of second winding part 110b are located on the inner portion of stator 10.

In this case, in first molded coil 100a, first terminal part 120a is provided so as to be located on the inner portion of stator 10, and meanwhile, located on the side of second molded coil 100b. Second terminal part 130a is provided so as to be located on the outer portion of stator 10, which is the side opposite to the inner portion of stator 10, and meanwhile, located on the side opposite to the side of second molded coil 100b.

Further, in second molded coil 100b, third terminal part 120b is provided so as to be located on the inner portion of stator 10, and meanwhile, located on the side of first molded coil 100a. Fourth terminal part 130b is provided so as to be located on the outer portion of stator 10, and meanwhile, located on the side opposite to the side of first molded coil 100a.

That is, first terminal part 120a of first molded coil 100a and third terminal part 120b of second molded coil 100b are located on the inner portion of stator 10. Second terminal part 130a of first molded coil 100a and fourth terminal part 130b of second molded coil 100b are located on the outer portion of stator 10. First terminal part 120a of first molded coil 100a and third terminal part 120b of second molded coil 100b are provided in proximity to each other. Second terminal part 130a of first molded coil 100a and fourth terminal part 130b of second molded coil 100b are provided so as to separate from each other. Therefore, when stator 10 is viewed from above along shaft center C of rotary shaft 23, first terminal part 120a and second terminal part 130a are located substantially diagonally in first molded coil 100a. Further, in second molded coil 100b, third terminal part 120b and fourth terminal part 130b are located substantially diagonally in a direction opposite to the diagonal direction of first terminal part 120a and second terminal part 130a.

In addition, when viewed from the radial direction of stator 10, first engaging part 122a provided on first terminal part 120a of first molded coil 100a and second engaging part 122b provided on third terminal part 120b of second molded coil 100b are located at the same height. For example, first engaging part 122a and second engaging part 122b are located on the same height with respect to the upper surface of coil end 111a or 111b. More specifically, the recess of first engaging part 122a and the protrusion of second engaging part 122b are located on the same height with respect to the upper surface of coil end 111a or 111b.

As described above, according to molded coil 100 and stator 10 of the present exemplary embodiment, the tip of first terminal part 120a of first molded coil 100a is disposed with first engaging part 122a that is engaged with second engaging part 122b disposed at the tip of third terminal part 120b of second molded coil 100b.

Molded coil 100 according to the present exemplary embodiment is one molded coil 100 that is one of two molded coils 100 disposed adjacent to each other, one molded coil 100 including: a winding part having a conductor stacked from the first turn to the n-th turn (n is an integer of 2 or more); first terminal part 120a that has lead part 121a extending from the first turn of the winding part in a direction orthogonal to the stacking direction of the conductor in the winding part; and second terminal part 130a that has a lead part extending from a portion of the n-th turn of the winding part in a direction orthogonal to the stacking direction of the conductor in the winding part, in which first terminal part 120a is provided at the tip with first engaging part 122a that is engaged with second engaging part 122b disposed at the tip of third terminal part 120b of other molded coil 100 of two molded coils 100.

Further, first terminal part 120a of first molded coil 100a and third terminal part 120b of second molded coil 100b are coupled by joining first engaging part 122a and second engaging part 122b.

With this configuration, two molded coils 100 being first molded coil 100a and second molded coil 100b can be directly coupled and connected to each other. Accordingly, two molded coils 100 being first molded coil 100a and second molded coil 100b can be easily connected to each other without using a coupling member such as a bus bar.

Specifically, as shown in FIG. 4, in the present exemplary embodiment, first engaging part 122a of first molded coil 100a has the recess, second engaging part 122b of second molded coil 100b has the protrusion, and first engaging part 122a is engaged with second engaging part 122b by fitting the protrusion and the recess to each other.

With this configuration, first engaging part 122a and second engaging part 122b can be fitted to each other by the recessed and protruded structure. Therefore, first engaging part 122a and second engaging part 122b can be easily engaged with and joined to each other. Therefore, first molded coil 100a and second molded coil 100b can be connected to each other more easily.

In addition, first molded coil 100a has, as a part of first winding part 110a of the portion of the first turn, extending part 112 extending toward second molded coil 100b. First terminal part 120a disposed with first engaging part 122a extends from the tip of extending part 112. Specifically, extending part 112 is disposed as a part of coil end 111a of first winding part 110a.

With this configuration, because first terminal part 120a is provided via coil end 111a, first terminal part 120a can be easily brought close to third terminal part 120b of second molded coil 100b. Moreover, by disposing extending part 112 using coil end 111a, first terminal part 120a can be easily brought close to third terminal part 120b without having first terminal part 120a formed into a complicated shape by bending or the like.

As described above, first terminal part 120a of first molded coil 100a being U-phase coil U1 and third terminal part 120b of second molded coil 100b being U-phase coil U2 are directly connected to each other without using a coupling member such as a bus bar.

In addition, second terminal part 130a of first molded coil 100a being U-phase coil U1 is connected to second terminal part 130a of molded coil 100 being U-phase coil U3 or fourth terminal part 130b of molded coil 100 being U-phase coil U4 by using a bus bar or a lead wire. Similarly, fourth terminal part 130b of second molded coil 100b being U-phase coil U2 is connected to second terminal part 130a of molded coil 100 being U-phase coil U3 or fourth terminal part 130b of molded coil 100 being U-phase coil U4 by using a bus bar or a lead wire.

Four molded coils 100 being V-phase coils V1 to V4 and four molded coils 100 being NV-phase coils W1 to W4 can be respectively connected in the same manner as four molded coils 100 being U-phase coils U1 to U4.

In addition, instead of bringing first terminal part 120*a* of first molded coil 100*a* being U-phase coil U1 and third terminal part 120*b* of second molded coil 100*b* being U-phase coil U2 close to each other, in first molded coil 100*a*, first terminal part 120*a* and second terminal part 130*a* are disposed on a diagonal line to separate first terminal part 120*a* and second terminal part 130*a* from each other in order to secure the insulation breakdown voltage between the terminals. Similarly, also in second molded coil 100*b*, third terminal part 120*b* and fourth terminal part 130*b* are disposed on a diagonal line to separate third terminal part 120*b* and fourth terminal part 130*b* from each other in order to secure the insulation breakdown voltage between the terminals.

However, as a result, the terminal part of molded coil 100 being V-phase coil V2, between two adjacent molded coils 100 adjacent to first molded coil 100*a* being U-phase coil U1, approaches second terminal part 130*a* of first molded coil 100*a*.

Therefore, in the present exemplary embodiment, second terminal part 130*a* of first molded coil 100*a* being U-phase coil U1 is retracted from the circumferential end edge of first winding part 110*a* (the end edge of V-phase coil V2 on the side of molded coil 100). As a result, the distance between second terminal part 130*a* of first molded coil 100*a* being U-phase coil U1 and the end edge of first winding part 110*a* on the side opposite to the side of second molded coil 100*b* (the end edge of V-phase coil V2 on the side of molded coil 100 is different from the distance between fourth terminal part 130*b* of second molded coil 100*b* being U-phase coil U2 and the end edge of second winding part 110*b* on the side opposite to the side of first molded coil 100*a* (the end edge of W-phase coil W3 on the side of molded coil 100).

With this configuration, second terminal part 130*a* of first molded coil 100*a* can be separated from the terminal part of molded coil 100 located adjacent to the side opposite to second molded coil 100*b* directly connected to first molded coil 100*a*. As a result, the distance between second terminal part 130*a* of first molded coil 100*a* and the terminal part of molded coil 100 located adjacent to the side opposite to second molded coil 1001 can be increased, which enables the insulation breakdown voltage between the terminal parts to be improved.

In the above exemplary embodiment, as the structure in which first engaging part 122*a* of first terminal part 120*a* and second engaging part 122*b* of third terminal part 120*b* are fitted to each other, the recess is provided in first engaging part 122*a* and the protrusion is provided in second engaging part 122*b*, but the structure is not limited thereto.

Figure 5A:
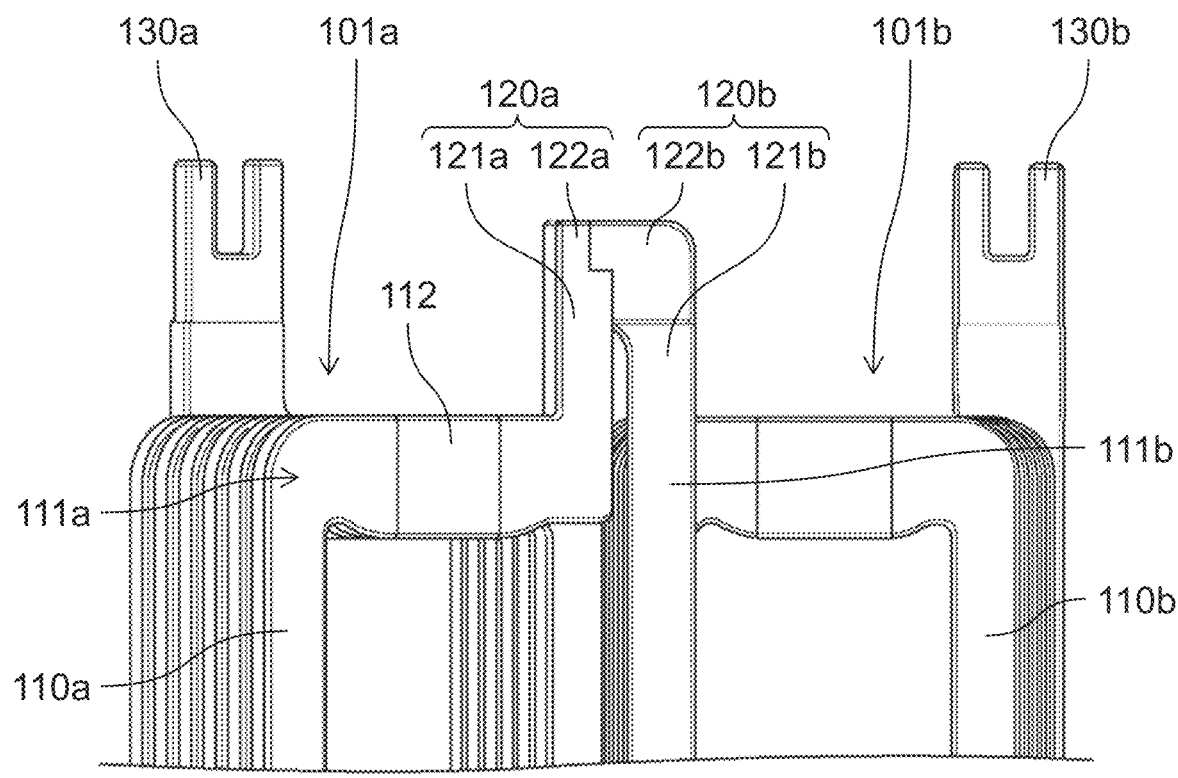
FIG. 5A is an enlarged view of two molded coils adjacent to each other in the stator according to a first modification.
Figure 5B:
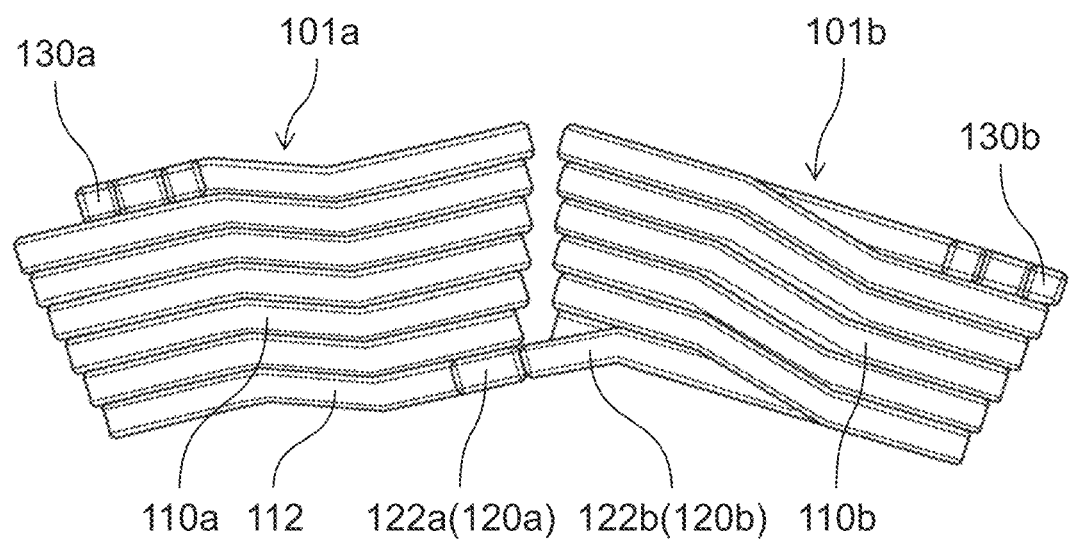
FIG. 5B is a top view of the two molded coils adjacent to each other in the stator according to the first modification.
Figure 6:
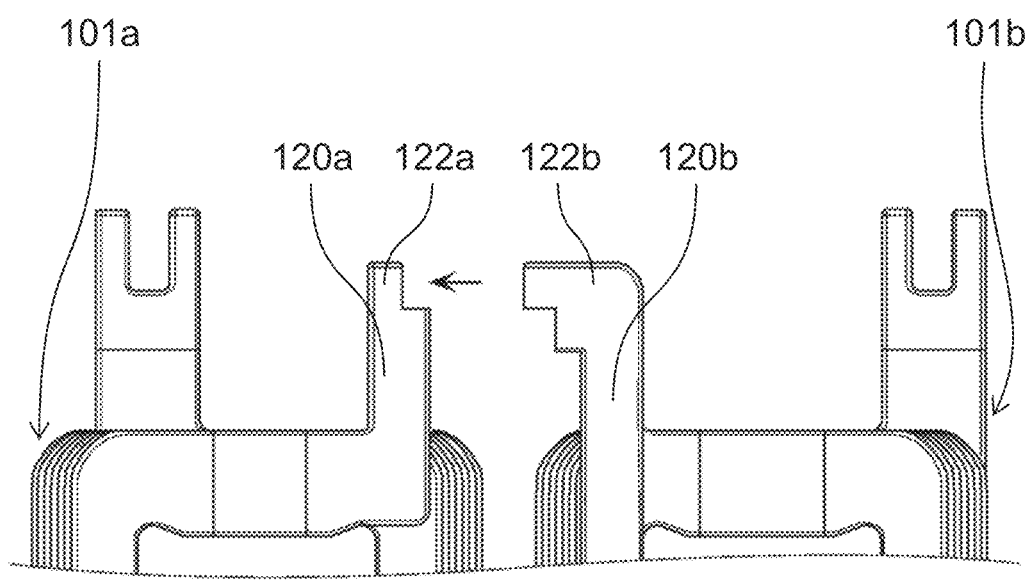
FIG. 6 is a view showing a manner of coupling the two molded coils adjacent to each other in the stator according to the first modification.

For example, as shown in FIGS. 5A, 5B, and 6, first engaging part 122*a* of first terminal part 120*a* of first molded coil 101*a* and second engaging part 122*b* of third terminal part 120*b* of second molded coil 101*b* may have steps fitted to each other. FIG. 5A is an enlarged view of two molded coils adjacent to each other in the stator according to a first modification. FIG. 5B is a top view of the two molded coils adjacent to each other in the stator according to the first modification. FIG. 6 is a view showing a manner of coupling the two molded coils adjacent to each other in the stator according to the first modification. That is, first molded coil 101*a* has the step that is fitted to the step of second engaging part 122*b* of second molded coil 101*b*. Second molded coil 101*b* may have the step that is fitted to the step of first engaging part 122*a* of first molded coil 101*a*.

As shown in FIG. 6, first engaging part 122*a* and second engaging part 122*b* can be engaged with each other by fitting the step of first engaging part 122*a* and the step of second engaging part 122*b* to each other. Also in this case, first engaging part 122*a* and second engaging part 122*b* can be fitted to each other by the recessed and protruded structure. Therefore, first engaging part 122*a* and second engaging part 122*b* can be easily engaged with and joined to each other. Accordingly, first molded coil 101*a* and second molded coil 101*b* can be easily connected to each other without using a coupling member such as a bus bar.

In addition, the above exemplary embodiment has the structure in which first engaging part 122*a* of first molded coil 100*a* and second engaging part 122*b* of second molded coil 100*b* are fitted to each other in the circumferential direction of stator 10, but the structure is not limited thereto.

Figure 7A:
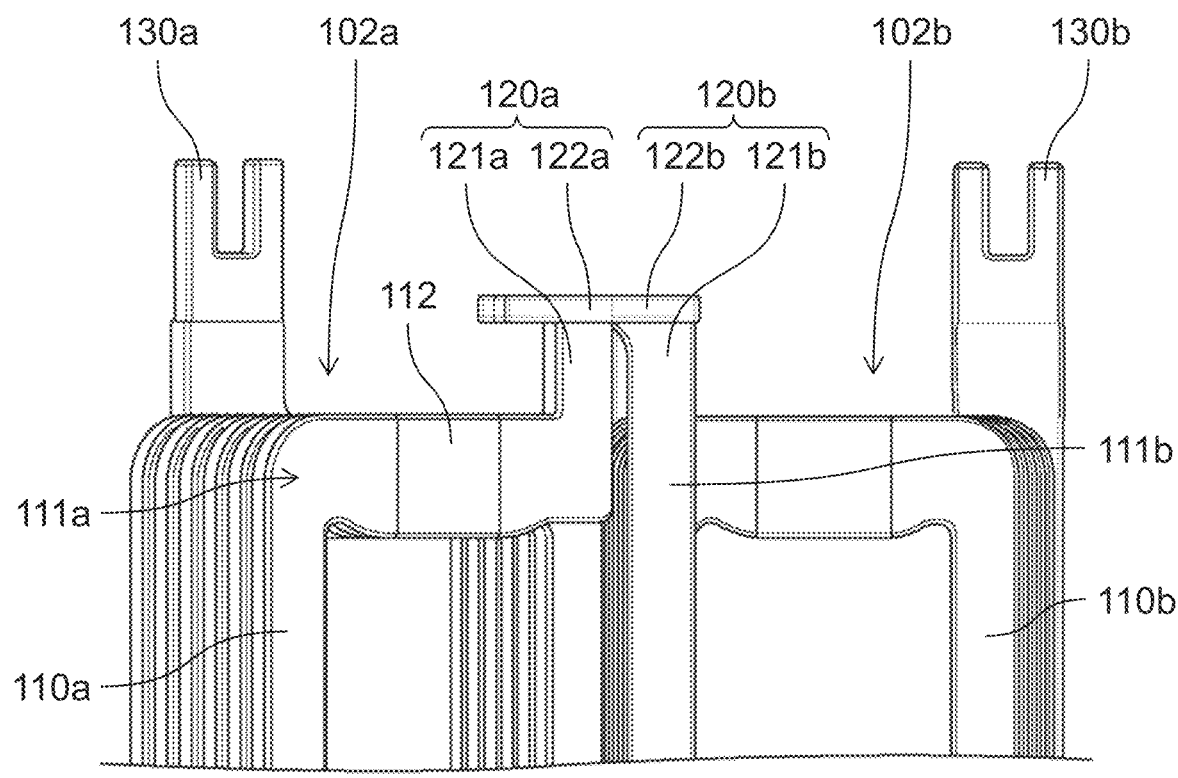
FIG. 7A is an enlarged view of two molded coils adjacent to each other in the stator according to a second modification.
Figure 7B:
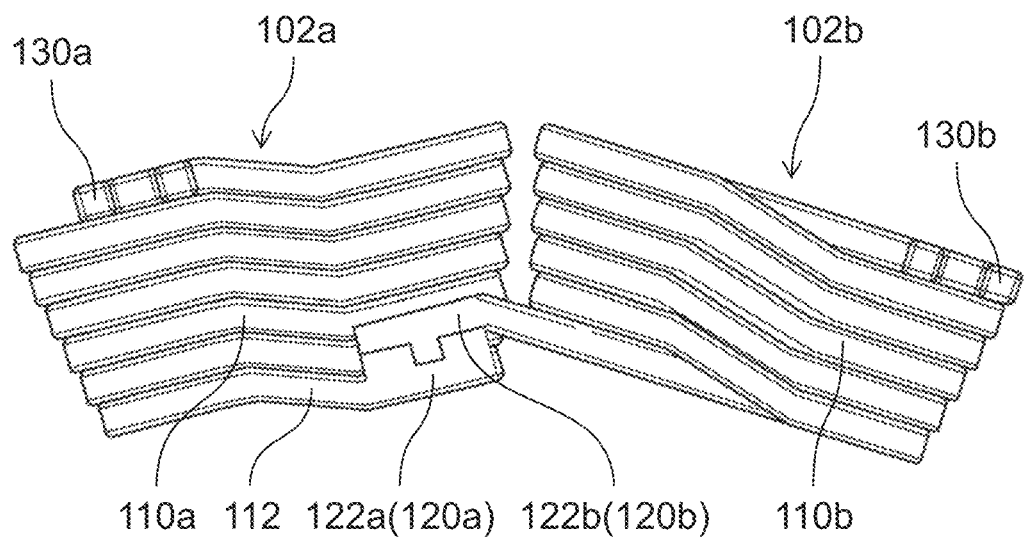
FIG. 7B is a top view of the two molded coils adjacent to each other in the stator according to the second modification.

For example, as shown in FIGS. 7A and 7B, first engaging part 122*a* of first molded coil 102*a* and second engaging part 122*b* of second molded coil 102*b* may be configured to be fitted to each other in the radial direction of stator 10. FIG. 7A is an enlarged view of two molded coils adjacent to each other in the stator according to a second modification. FIG. 7B is a top view of the two molded coils adjacent to each other in the stator according to the second modification. Also in the present modification, a recess is provided in first engaging part 122*a* of first molded coil 102*a*. A protrusion is provided in second engaging part 122*b* of second molded coil 102*b*. With this recessed and protruded structure, first engaging part 122*a* and second engaging part 122*b* can be fitted to each other. Accordingly, first molded coil 102*a* and second molded coil 102*b* can be easily connected to each other without using a coupling member such as a bus bar.

Figure 8:
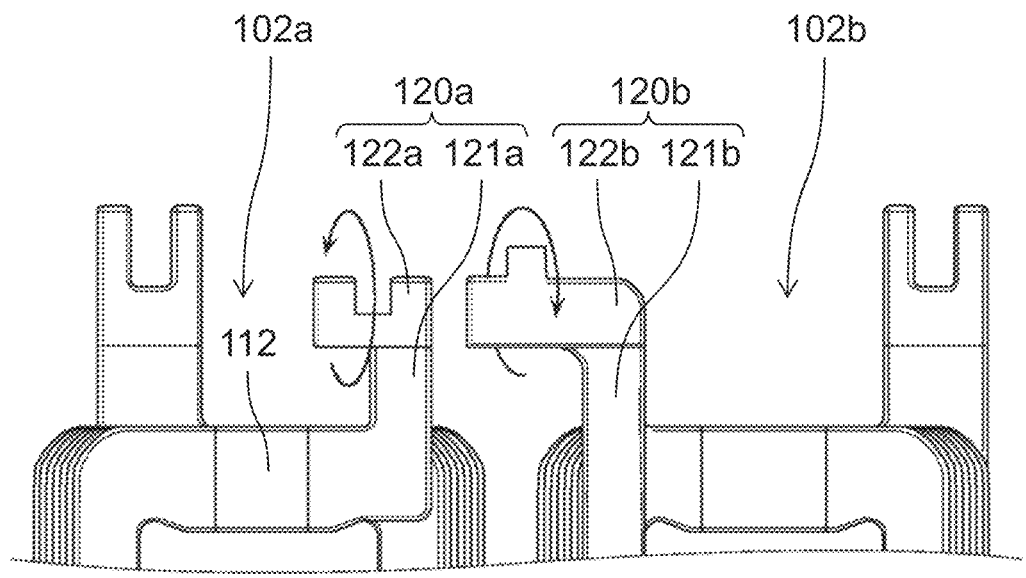
FIG. 8 is a view showing a manner of coupling two molded coils adjacent to each other in the stator according to the second modification.

FIG. 8 is a view showing a manner of coupling the two molded coils adjacent to each other in the stator according to the second modification. In this case, for example, as shown in FIG. 8, a recess recessed downward is provided in first engaging part 122*a* of first molded coil 102*a*. A protrusion protruding upward is provided in second engaging part 122*b* of second molded coil 102*b*. As shown by arrows in FIG. 8, by bending first engaging part 122*a* and second engaging part 122*b* to allow the recess and the protrusion to face each other, first engaging part 122*a* and second engaging part 122*b* can be fitted to each other.

Figure 9:
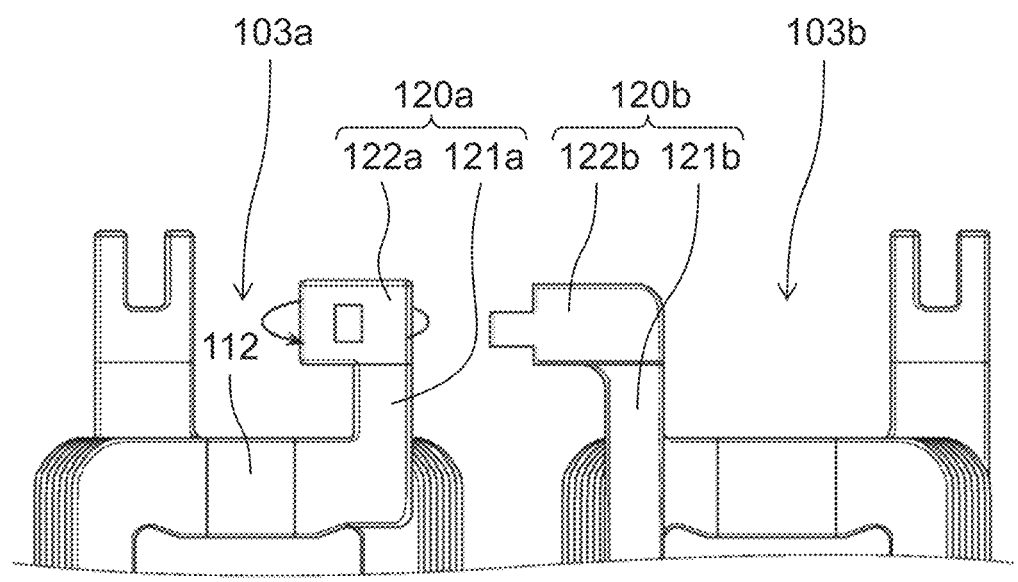
FIG. 9 is a view showing a configuration of two molded coils adjacent to each other in the stator and a manner of coupling the two molded coils adjacent to each other in the stator according to a third modification.

In the above exemplary embodiment, the structure in which first engaging part 122*a* and second engaging part 122*b* are fitted to each other is a combination of the recess and the protrusion, but the structure is not limited thereto. FIG. 9 is a view showing a configuration of two molded coils adjacent to each other in the stator and a manner of coupling the two molded coils adjacent to each other in the stator according to a third modification. For example, as shown in FIG. 9, the structure in which first engaging part 122*a* and second engaging part 122*b* are fitted to each other may be a combination of a hole and a protrusion. Specifically, a hole is provided in first engaging part 122*a* of first molded coil 103*a*. A protrusion is provided in second engaging part 122*b* of second molded coil 103*b*. By inserting the protrusion in the hole, first engaging part 122*a* and second engaging part 122*b* are fitted to each other. Accordingly, in this structure, first molded coil 103*a* and second molded coil 103*b* can be easily connected to each other without using a coupling member such as a bus bar. Note that, although the hole is a through hole, the hole may not need to penetrate as long as the hole has a shape that allows the protrusion to be inserted and is engaged with the protrusion. For example, as shown in FIG. 9, the hole that penetrates in the radial direction is provided in first engaging part 122*a* of first molded coil 103*a*. The protrusion protruding in the circumferential direction is provided in second engaging part 122*b* of second molded coil 103*b*. By bending first engaging part 122*a* to allow the hole and the protrusion to face each other, the hole of first engaging part 122a and the protrusion of second engaging part 122b can be fitted to each other in the circumferential direction.

Figure 10:
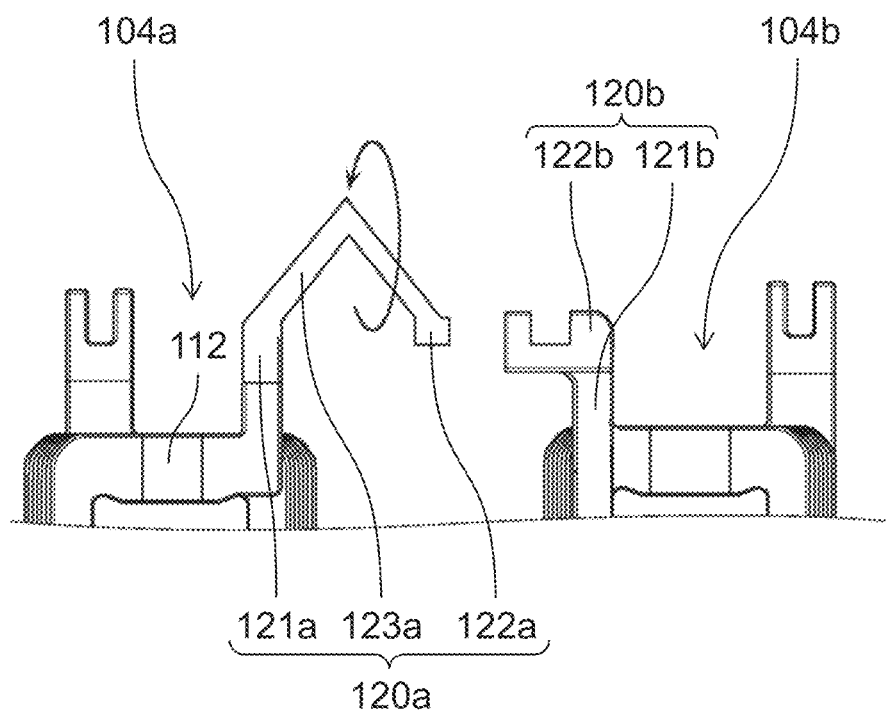
FIG. 10 is a view showing a configuration of two molded coils adjacent to each other in the stator according to a fourth modification.

FIG. 10 is a view showing a configuration of two molded coils adjacent to each other in the stator according to a fourth modification. As shown in FIG. 10, first terminal part 120a of first molded coil 104a may be provided with bent part 123a that is partially bent, in addition to lead part 121a and first engaging part 122a. That is, first terminal part 120a may have lead part 121a, first engaging part 122a, and bent part 123a.

Bent part 123a is disposed between a tip and a base of first terminal part 120a. Specifically, bent part 123a is provided between lead part 121a and first engaging part 122a. One end of bent part 123a and lead part 121a are connected to each other. The other end of bent part 123a and first engaging part 122a are connected to each other. Bent part 123a has a shape that is bent at about 90° at one place in the middle.

In the present modification, a recess is provided in second engaging part 122b of second molded coil 104b. First engaging part 122a of first molded coil 104a is fitted to second engaging part 122b. In this case, as indicated by an arrow in FIG. 10, the base of bent part 123a is bent to fit first engaging part 122a into the recess of second engaging part 122b. However, the base of bent part 123a may not need to be bent to fit first engaging part 122a into the recess of second engaging part 122b.

As described above, with the recessed and protruded structure, first engaging part 122a and second engaging part 122b can be fitted to each other. Accordingly, first molded coil 104a and second molded coil 104b can be easily connected to each other without using a coupling member such as a bus bar.

Figure 11A:
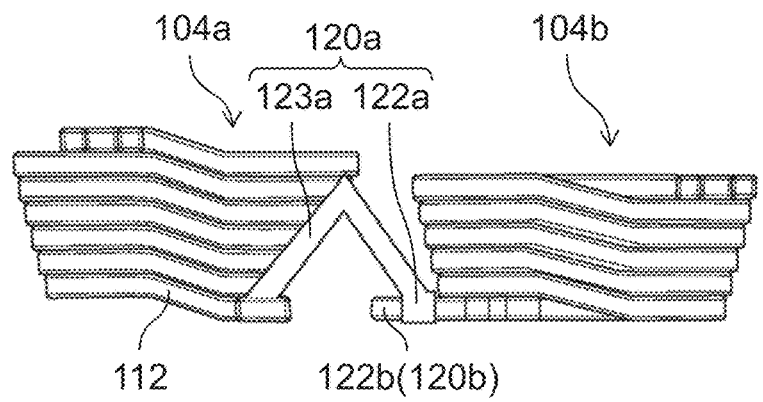
FIG. 11A is a view showing a manner of coupling the two molded coils shown in FIG. 10.
Figure 11B:
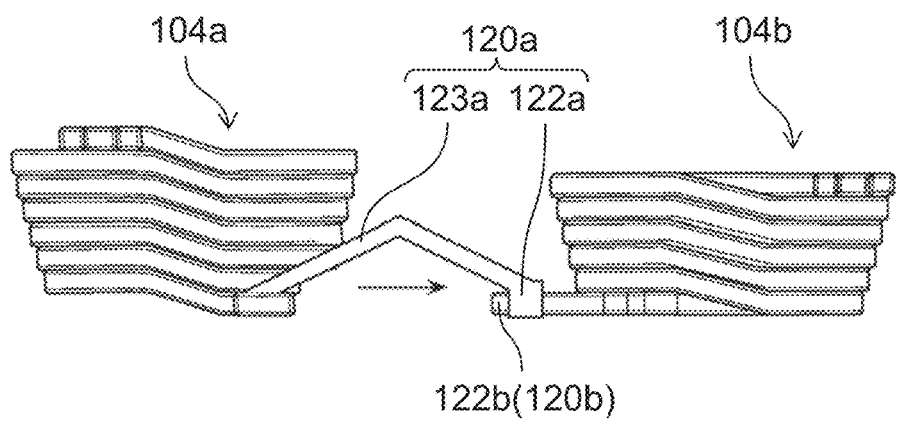
FIG. 11B is another view showing the manner of coupling the two molded coils shown in FIG. 10.
Figure 11C:
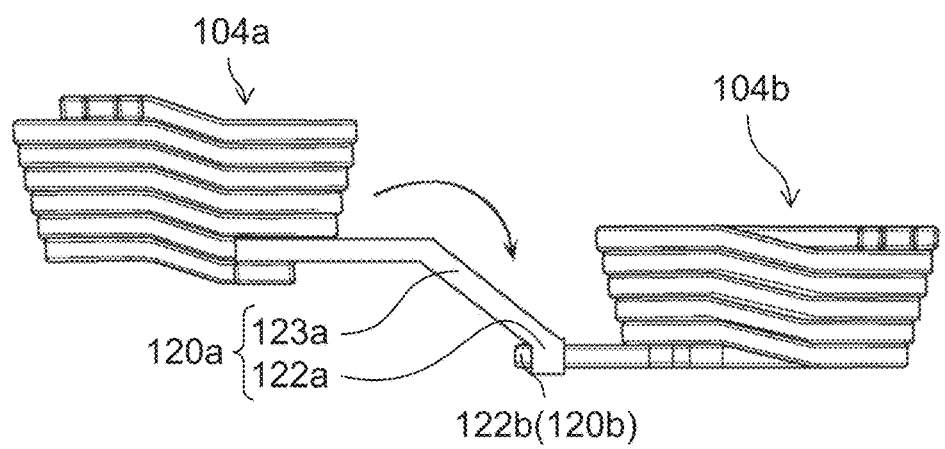
FIG. 11C is yet another view showing the manner of coupling the two molded coils shown in FIG. 10.

FIG. 11A is a view showing a manner of coupling the two molded coils shown in FIG. 10. FIG. 11B is another view showing the manner of coupling the two molded coils shown in FIG. 10. FIG. 11C is yet another view showing the manner of coupling the two molded coils shown in FIG. 10. In the present modification, as shown in FIGS. 11A to 11C, first terminal part 120a has bent part 123a. In FIG. 11A, bent part 123a is bent at an acute angle. In FIG. 11B, bent part 123a is bent at an obtuse angle. As a result, the distance between first molded coil 104a and second molded coil 104b is made larger than that in FIG. 11A. In FIG. 11C, a portion where bent part 123a is straight with respect to first molded coil 104a, is provided. By deforming bent part 123a according to the distance between first molded coil 104a and second molded coil 104b, first engaging part 122a can be fitted to second engaging part 122b. As a result, positional deviation between first molded coil 104a and second molded coil 104b can be absorbed by bent part 123a.

Figure 12:
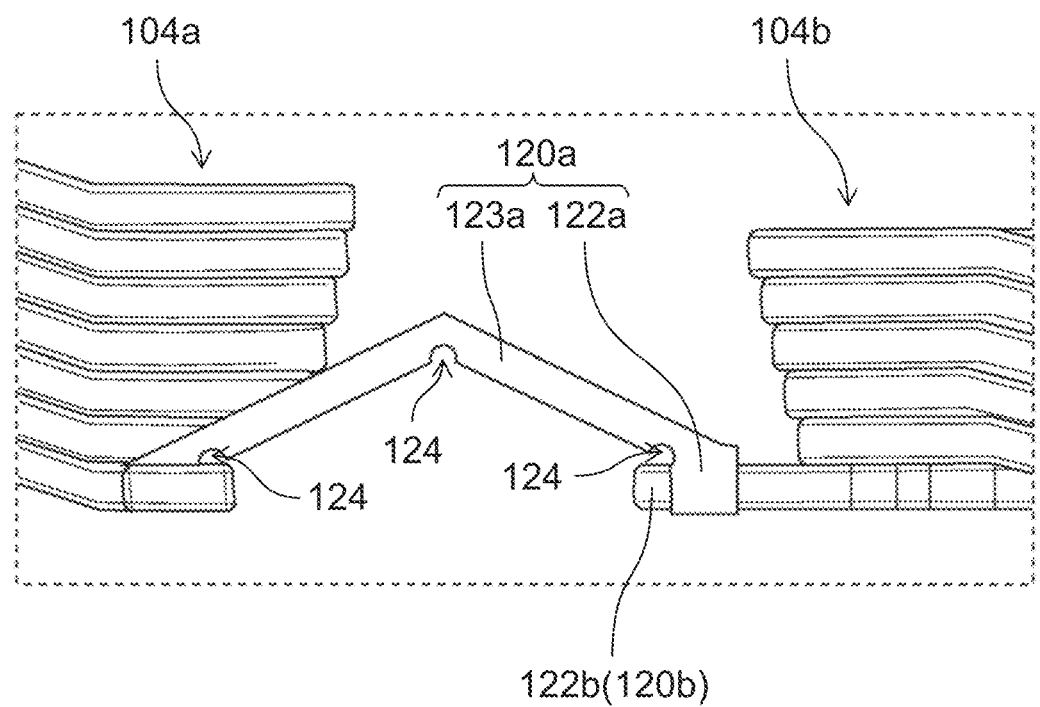
FIG. 12 is a view showing another configuration of the molded coil according to the fourth modification.

FIG. 12 is a view showing another configuration of the molded coil according to the fourth modification. As shown in FIG. 12, bent part 123a can be easily deformed by providing notch 124 in a portion on the valley folded side of bent part 123a. Notch 124 may be provided not only at the bent portion but also at the base of bent part 123a (that is, a connection portion between bent part 123a and lead part 121a) or may be provided at the tip of bent part 123a (that is, a connection portion between bent part 123a and first engaging part 122a).

Modifications

Although molded coil 100, stator 10, and electric motor 1 according to the present disclosure have been described above based on the exemplary embodiment, the present disclosure is not limited to the exemplary embodiment described above.

Figure 13:
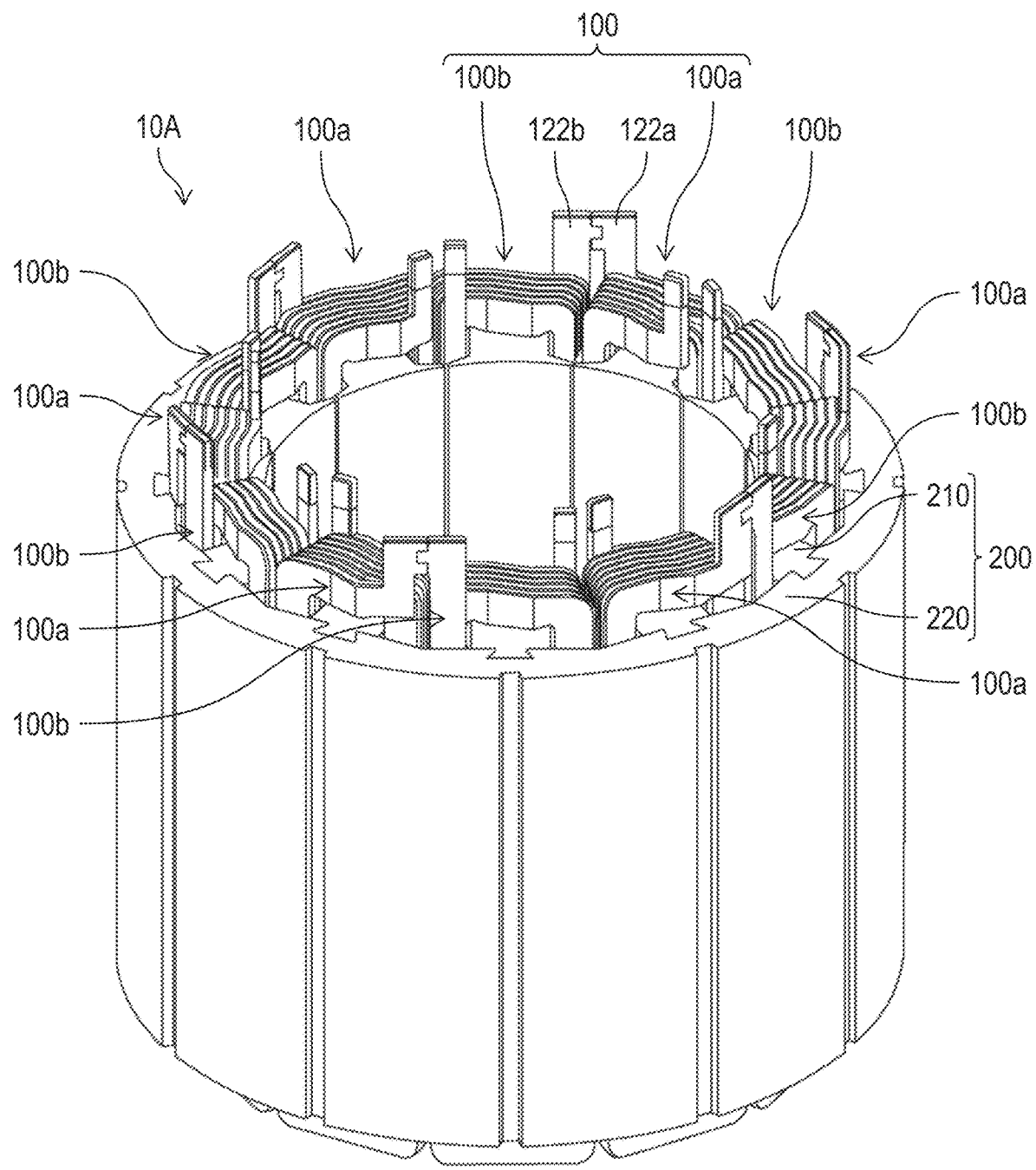
FIG. 13 is a perspective view of the stator according to a fifth modification.
Figure 14:
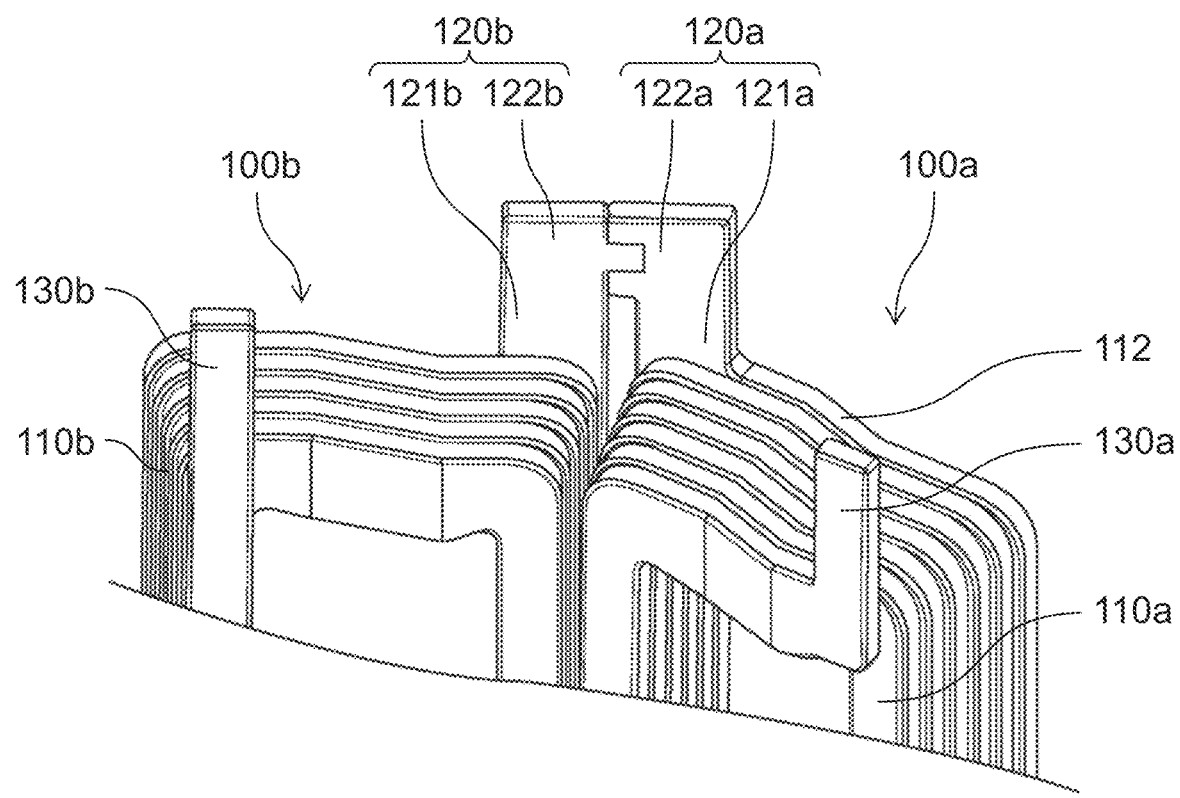
FIG. 14 is an enlarged view of two molded coils adjacent to each other in the stator according to the fifth modification.

For example, first molded coil 100a and second molded coil 100b are disposed such that first terminal part 120a and third terminal part 120b are located in the inner portion of stator 10, but the present disclosure is not limited thereto. FIG. 13 is a perspective view of stator 10A according to a fifth modification. FIG. 14 is an enlarged view of two molded coils adjacent to each other in stator 10A according to the fifth modification. For example, as in stator 10A shown in FIGS. 13 and 14, first molded coil 100a and second molded coil 100b may be disposed such that first terminal part 120a and third terminal part 120b are located in the outer portion of stator 10A.

It has been described that the recess or the hole is provided in first engaging part 122a of first molded coil 100a, and the protrusion is provided in second engaging part 122b of second molded coil 100b, but the present disclosure is not limited thereto. For example, a protrusion may be provided in first engaging part 122a of first molded coil 100a, and a recess or a hole may be provided in second engaging part 122b of second molded coil 100b.

The number of slots of stator 10 has been described as twelve, but the present disclosure is not limited thereto. The number of magnetic poles of rotor 20 has been described as ten, (i.e., the number of permanent magnets 22 is ten), but the present disclosure is not limited thereto. Any number of slots of stator 10 and any number of magnetic poles of rotor 20 can be applied.

Rotor 20 has been described as the IPM rotor, but the present disclosure is not limited thereto. For example, in the case of using a permanent magnet type rotor as rotor 20, a surface magnet type rotor (surface permanent magnetic (SPM) rotor) in which a plurality of permanent magnets are provided on the outer surface of the rotor core may be used.

Although electric motor 1 has been exemplified as rotary electric machine, the present disclosure is not limited thereto. For example, the rotary electric machine using the molded coil may be a generator.

The present disclosure includes embodiments which those skilled in the art can obtain by adding various changes to the exemplary embodiment described above, as well as embodiments implemented by freely combining constitutional elements and functions described in the exemplary embodiment without deviating from the spirit of the present disclosure.

INDUSTRIAL APPLICABILITY

The technology of the present disclosure can be widely used for various products using a molded coil, including a rotary electric machine such as an electric motor.

REFERENCE MARKS IN THE DRAWINGS

1: electric motor
10, 10A: stator
20: rotor
21: rotor core
22: permanent magnet
23: rotary shaft
100: molded coil
100a, 101a, 102a, 103a, 104a: first molded coil
100b, 101b, 102b, 103b, 104b: second molded coil
110a: first winding part
110b: second winding part
111a, 111b: coil end 112: extending part
120a: first terminal part
120b: third terminal part
121a, 121b: lead part
122a: first engaging part
122b: second engaging part
123a: bent part
124: notch
130a: second terminal part
130b: fourth terminal part
200: stator core
210: teeth
220: yoke
230: slot
U1 to U4: U-phase coil
V1 to V4: V-phase coil
W1 to W4: W-phase coil

The invention claimed is:

1. A molded coil being one of two molded coils disposed adjacent to each other without interposing any other molded coil, the molded coil comprising:
a winding part having a conductor stacked from a first turn to an n-th turn, where n is an integer of 2 or more;
a first terminal part that has a lead part extending from the first turn of the winding part in a first direction orthogonal to a stacking direction of the conductor in the winding part; and
a second terminal part that has a lead part extending from a portion of the n-th turn of the winding part in the first direction in the winding part, wherein:
the first terminal part includes a first tip including a first engaging part, the second terminal part includes a second tip including a second engaging part, and
at least one of the first tip or the second tip includes a protruding part that protrudes from the lead part in a second direction crossing the first direction and the stacking direction when viewed from the first direction, and a length of the protruding part is smaller than a width of the winding part when viewed from the first direction.

2. The molded coil according to claim 1, further comprising, as a part of the winding part of the portion of the first turn, an extending part extending toward the other molded coil, wherein the first terminal part extends from a tip of the extending part.

3. The molded coil according to claim 1, wherein one of the first engaging part and the second engaging part includes a protrusion,
another of the first engaging part and the second engaging part includes a recess or a hole, and the first engaging part is engaged with the second engaging part by fitting the protrusion to the recess or the hole.

4. The molded coil according to claim 1, wherein the first engaging part includes a step fitted to a step of the second engaging part.

5. The molded coil according to claim 1, wherein the first terminal part includes a bent part that is bent between the tip and a base of the first terminal part.

6. The molded coil according to claim 5, wherein the bent part includes a notch in a portion on a valley folded side.

7. A stator comprising:
a core including a plurality of teeth; and
a plurality of molded coils each wound around a corresponding one of the plurality of teeth, wherein:
the plurality of molded coils include a first molded coil and a second molded coil disposed immediately adjacent to the first molded coil without interposing any other molded coil, the first molded coil and the second molded coil having a same phase,
the first molded coil includes:
a first winding part having a first conductor stacked from a first turn to an $n_1$-th turn, where $n_1$ is an integer of 2 or more;
a first terminal part having a lead part extending from a portion of the first turn of the first winding part in a direction orthogonal to a stacking direction of the first conductor in the first winding part; and
a second terminal part having a lead part extending from a portion of the $n_1$-th turn of the first winding part in the direction orthogonal to the stacking direction of the first conductor in the first winding part,
the second molded coil includes:
a second winding part having a second conductor stacked from a first turn to an $n_2$-th turn, where $n_2$ is an integer of 2 or more;
a third terminal part having a lead part extending from a portion of the first turn of the second winding part in a direction orthogonal to a stacking direction of the second conductor in the second winding part; and
a fourth terminal part having a lead part extending from a portion of the $n_2$-th turn of the second winding part in the direction orthogonal to the stacking direction of the second conductor in the second winding part,
the first terminal part of the first molded coil includes a tip including a first engaging part, the third terminal part of the second molded coil includes a tip including a second engaging part
that is engaged with the first engaging part of the first molded coil, and
the first terminal part of the first molded coil is coupled to the third terminal part of the second molded coil by joining the first engagement part to the second engaging part.

8. The stator according to claim 7, wherein
the first molded coil includes an extending part that extends, as a part of a coil end of the first winding part of the portion of the first turn, toward the second molded coil, and
the first terminal part extends from a tip of the extending part.

9. The stator according to claim 7, wherein the first engaging part and the second engaging part have shapes that fit to each other.

10. The stator according to claim 7, wherein the first terminal part includes a bent part that is bent between the tip of the first terminal part and a base of the first terminal part.

11. The stator according to claim 10, wherein the bent part includes a notch in a portion on a valley folded side.

12. The stator according to claim 7, wherein
the first molded coil and the second forming coil are disposed to allow the first turn of the first winding part and the first turn of the second winding part to be located on a first side in the stacking direction,
the first terminal part is located on the first side in the stacking direction, and on a third side of the first molded coil in the direction orthogonal to the stacking direction, the third side being a side closer to the second molded coil in the direction orthogonal to the stacking direction,
the second terminal part is provided to be located on a second side opposite to the first side in the stacking direction, and located on a fourth side opposite to the third side in the direction orthogonal to the stacking direction, the third terminal part is provided to be located on the first side in the stacking direction and on the fourth side closer to the first molded coil in the direction orthogonal to the stacking direction, and the fourth terminal part is provided to be located on the second side in the stacking direction, and located on the third side opposite to the fourth side in the direction orthogonal to the stacking direction.

13. The stator according to claim 12, wherein the second terminal part has a distance between the second terminal part and an end edge of the first winding part on a side opposite to the side of the second molded coil, the distance being different from a distance between the fourth terminal part and an end edge of the second winding part on a side opposite to the side of the first molded coil.

14. The stator according to claim 7, wherein the first terminal part and the third terminal part are located in an inner portion of the stator.

15. The stator according to claim 7, wherein the first terminal part and the third terminal part are located in an outer portion of the stator.

16. A rotary electric machine comprising:
the stator according to claim 7; and
a rotor that rotates by a magnetic force of the stator.

17. The stator according to claim 1, wherein a length of the protruding part is smaller than a width of the winding part when viewed from the first direction.

18. A stator comprising:
a core including a plurality of teeth; and
a plurality of molded coils each wound around a corresponding one of the plurality of teeth, wherein:
the plurality of molded coils include a first molded coil and a second molded coil disposed adjacent to the first molded coil,
the first molded coil includes:
  a first winding part having a first conductor stacked from a first turn to an $n_1$-th turn, where $n_1$ is an integer of 2 or more;
  a first terminal part having a lead part extending from a portion of the first turn of the first winding part in a direction orthogonal to a stacking direction of the first conductor in the first winding part; and a second terminal part having a lead part extending from a portion of the $n_1$-th turn of the first winding part in the direction orthogonal to the stacking direction of the first conductor in the first winding part, the second molded coil includes:
  a second winding part having a second conductor stacked from a first turn to an $n_2$-th turn, where $n_2$ is an integer of 2 or more;
  a third terminal part having a lead part extending from a portion of the first turn of the second winding part in a direction orthogonal to a stacking direction of the second conductor in the second winding part; and
  a fourth terminal part having a lead part extending from a portion of the $n_2$-th turn of the second winding part in the direction orthogonal to the stacking direction of the second conductor in the second winding part,
the first terminal part includes a tip including a first engaging part, the third terminal part includes a tip including a second engaging part that is engaged with the first engaging part, and
the first terminal part is coupled to the third terminal part by joining the first engagement part to the second engaging part,
the first molded coil and the second forming coil are disposed to allow the first turn of the first winding part and the first turn of the second winding part to be located on a first side in the stacking direction,
the first terminal part is located on the first side in the stacking direction, and on a third side of the first molded coil in the direction orthogonal to the stacking direction, the third side being a side closer to the second molded coil in the direction orthogonal to the stacking direction,
the second terminal part is provided to be located on a second side opposite to the first side in the stacking direction, and located on a fourth side opposite to the third side in the direction orthogonal to the stacking direction,
the third terminal part is provided to be located on the first side in the stacking direction and on the fourth side closer to the first molded coil in the direction orthogonal to the stacking direction, and the fourth terminal part is provided to be located on the second side in the stacking direction, and
located on the third side opposite to the fourth side in the direction orthogonal to the stacking direction.

19. The stator according to claim 18, wherein the second terminal part has a distance between the second terminal part and an end edge of the first winding part on a side opposite to the side of the second molded coil, the distance being different from a distance between the fourth terminal part and an end edge of the second winding part on a side opposite to the side of the first molded coil.

* * * * *